US008862169B2

(12) United States Patent
Makh et al.

(10) Patent No.: US 8,862,169 B2
(45) Date of Patent: Oct. 14, 2014

(54) BEACON TRANSMISSION FOR A SET OF FEMTOCELLS

(75) Inventors: Vansh Pal Singh Makh, San Diego, CA (US); Yeliz Tokgoz, San Diego, CA (US); Peerapol Tinnakornsrisuphap, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 13/331,327

(22) Filed: Dec. 20, 2011

(65) Prior Publication Data

US 2012/0329456 A1  Dec. 27, 2012

Related U.S. Application Data

(60) Provisional application No. 61/425,465, filed on Dec. 21, 2010.

(51) Int. Cl.
*H04B 15/00* (2006.01)
*H04W 48/14* (2009.01)
*H04W 84/04* (2009.01)

(52) U.S. Cl.
CPC ............ *H04W 48/14* (2013.01); *H04W 84/045* (2013.01)
USPC ............. 455/502; 455/41.1; 455/41.2; 455/9; 455/435.1

(58) Field of Classification Search
None
See application file for complete search history.

(56) References Cited

U.S. PATENT DOCUMENTS

| 8,452,305 | B2* | 5/2013 | Brisebois et al. ........... 455/456.1 |
| 2009/0156165 | A1 | 6/2009 | Raghothaman et al. |
| 2009/0215400 | A1 | 8/2009 | Chang et al. |
| 2010/0099431 | A1 | 4/2010 | Sampath et al. |
| 2010/0203890 | A1* | 8/2010 | Nagaraja et al. ............. 455/436 |

OTHER PUBLICATIONS

Humblet P et al: "System design of cdma2000 femtocells -[femtocell wireless communications]", IEEE Communications Magazine, IEEE Service Center, Piscataway, US, vol. 47, No. 9, Sep. 1, 2009, pp. 92-100, XP011277730, ISSN: 0163-6804.*
Humblet, P., et al., "System design of CDMA2000 femtocells", IEEE Communications Magazine, Sep. 1, 2009, pp. 92-100, vol. 47, No. 9, IEEE Service Center, Piscataway, US, XP011283370, ISSN: 0163-6804, LNKDDOI: 10.1109/MC0M.2009.5277461, p. 97,98 Preferred User Zone List, Dual Mode Mobile issues.
International Search Report and Written Opinion—PCT/US2011/066653—ISA/EPO—Jul. 13, 2012.
Partial International Search Report—PCT/US2011/066653—ISA/EPO—Apr. 10, 2012.

* cited by examiner

*Primary Examiner* — Charles Appiah
*Assistant Examiner* — Randy Peaches
(74) *Attorney, Agent, or Firm* — Linda Gunderson

(57) ABSTRACT

Transmissions of beacons by a set of access points (e.g., femtocells) are synchronized to facilitate discovery of the access points by an access terminal moving through the coverage areas of the access points. In some embodiments, periodic beacon transmissions are synchronized across all of the femtocells of a set of femtocells such that each femtocell transmits a beacon signal according to a similar pattern and at the same time. In some embodiments, an opportunistic beacon control scheme involves commencing beacon transmissions by at least one femtocell of a set of femtocells upon determining that an access terminal has communicated with one or more of the femtocells.

66 Claims, 14 Drawing Sheets

BEACON TRANSMISSION FOR A SET OF FEMTOCELLS

CLAIM OF PRIORITY

This application claims the benefit of and priority to commonly owned U.S. Provisional Patent Application No. 61/425,465, filed Dec. 21, 2010, the disclosure of which is hereby incorporated by reference herein.

BACKGROUND

1. Field

This application relates generally to wireless communication and more specifically, but not exclusively, to synchronizing beacon transmission for a set of femtocells.

2. Introduction

A wireless communication network may be deployed over a defined geographical area to provide various types of services (e.g., voice, data, multimedia services, etc.) to users within that geographical area. In a typical implementation, access points (e.g., each supporting one or more macro cells) are distributed throughout a macro network to provide wireless connectivity for access terminals (e.g., cell phones) that are operating within the geographical area served by the network.

As the demand for high-rate and multimedia data services rapidly grows, there lies a challenge to implement efficient and robust communication systems with enhanced performance. To supplement conventional network access points (e.g., macro access points), small-coverage access points (e.g., with transmit power of 20 dBm or less) may be deployed to provide more robust coverage for access terminals. For example, a small-coverage access point installed in a user's home or in an enterprise environment (e.g., commercial buildings) may provide voice and high speed data service for access terminals supporting cellular radio communication (e.g. CDMA, WCDMA, UMTS, LTE, etc.).

In some cases, small-coverage access points may be referred to as, for example, femtocells, femto access points, home NodeBs, home eNodeBs, access point base stations, picocells, etc. Typically, such small-coverage access points are connected to the Internet and the mobile operator's network via a DSL router, a cable modem, or some other suitable means of connectivity. For convenience, small-coverage access points may be referred to as femtocells or femto access points in the discussion that follows.

In practice, macrocells are typically deployed on multiple frequencies. Due to scarcity of spectrum resources, femtocells often share the frequency channels used by the macrocells or are deployed on adjacent frequency channels. To attract the macrocell users idling on the macrocell frequencies to the femtocell frequency, a femtocell radiates beacon signals (e.g., comprising pilot, paging, and synchronization channels) on the macrocell frequencies. Information included in the beacon signal (e.g., control channel overhead messages) will enable an access terminal that is idling on the macrocell frequency to be redirected to the femtocell frequency. However, these beacon signal transmissions by the femtocell may create interference on the macro network that can affect the voice call quality of users receiving active service on the macrocell frequency and, in some cases, lead to call drops.

To limit this interference, the femtocells may transmit beacon signals in a periodic manner. However, this present a challenge to ensure that access terminals moving throughout coverage areas provided by femtocells will be able to quickly acquire the beacon signals transmitted by the femtocells.

SUMMARY

A summary of several sample aspects of the disclosure follows. This summary is provided for the convenience of the reader and does not wholly define the breadth of the disclosure. For convenience, the term some aspects may be used herein to refer to a single aspect or multiple aspects of the disclosure.

The disclosure relates in some aspects to controlling transmissions of beacon signals by a set of femtocells or other similar types of access points (hereafter referred simply to as femtocells for convenience). In a typical implementation, the set of femtocells is deployed in an enterprise environment (e.g., within a building or in a campus environment).

The disclosure relates in some aspects to ensuring that an access terminal (e.g., that periodically wakes up during idle-mode) is able to receive a beacon signal from at least one of the femtocells within a specified time period (e.g., corresponding to the access terminal's wake-up time interval). For example, periodic beacon signal transmissions may be synchronized across the femtocells in the deployment such that each femtocell transmits a beacon signal according to a similar pattern and at the same time. This can ensure that the access terminal receives the beacon signals even when the access terminal moves between the coverage areas of different femtocells in the deployment. This approach may thus provide for quicker beacon discovery by the access terminal as compared to an approach where each femtocell independently determines when to transmit beacon signals (e.g., where it is possible that the access terminal may not receive a beacon signal for a long period of time when the access terminal moves between the coverage areas of different femtocells).

The disclosure relates in some aspects to an opportunistic beacon scheme whereby beacon signal transmissions by at least one femtocell of a set of femtocells are initiated upon determining that an access terminal has communicated with one or more of the femtocells. In some cases, this communication comprises registration (e.g., cdma2000 1x registration) of the access terminal at a femtocell.

The disclosure relates in some aspects to selecting the femtocells that are to transmit beacon signals based on the femtocell(s) with which the access terminal communicated. For example, upon determining that the access terminal registered at a first femtocell, only those femtocells in the vicinity of the first femtocell may be instructed to commence beacon signal transmission. By restricting the beacon signals transmissions in this manner, interference on the beacon channels (e.g., macro frequencies) may be mitigated.

The disclosure relates in some aspects to actively probing the access terminal to track the mobility of the access terminal. In this case, the selection of the femtocells for transmitting beacon signals may be based on this mobility tracking. For example, as the access terminal moves from the coverage of one femtocell to the other femtocell, the subset of femtocells selected to transmit beacon signals may be changed.

BRIEF DESCRIPTION OF THE DRAWINGS

These and other sample aspects of the disclosure will be described in the detailed description and the claims that follow, and in the accompanying drawings, wherein:

Figure 1:
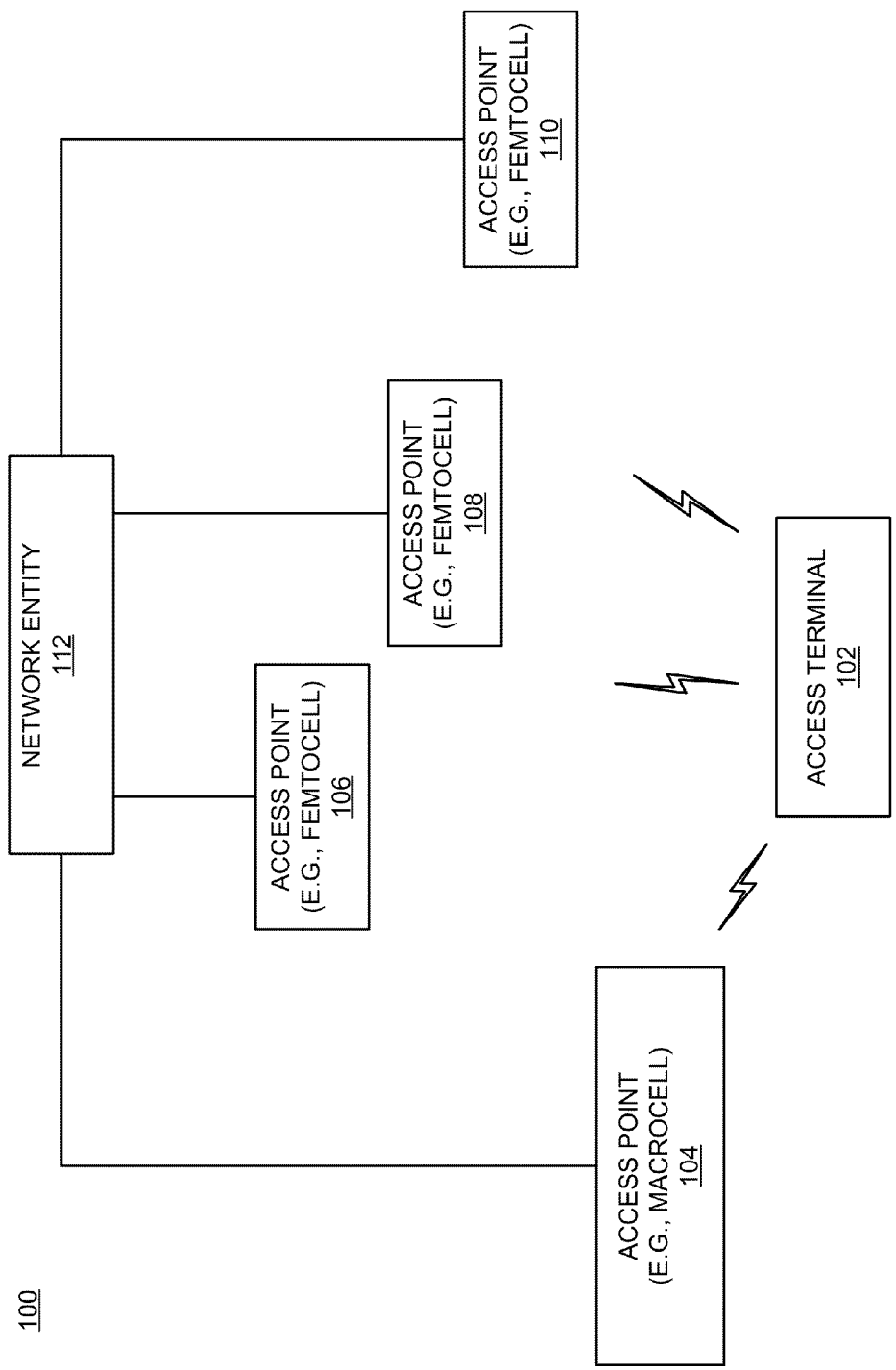
FIG. 1 is a simplified block diagram of several sample aspects of a communication system employing beacon signal transmissions.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, femtocells, Home NodeBs, Home eNodeBs, and so on, while access terminals may be referred to or implemented as user equipment (UEs), mobile stations, and so on.

Access points in the system 100 provide access to one or more services (e.g., network connectivity) for one or more wireless terminals (e.g., an access terminal 102) that may be installed within or that may roam throughout a coverage area of the system 100. For example, at various points in time the access terminal 102 may connect to an access point 104, an access point 106, an access point 108, an access point 110, or some access point in the system 100 (not shown). Each of these access points may communicate with one or more network entities (represented, for convenience, by a network entity 112) to facilitate wide area network connectivity.

The network entity 112 may take various forms such as, for example, one or more radio and/or core network entities. Thus, in various implementations the network entity 112 may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals. Also, two or more network entities may be co-located and/or two or more network entities may be distributed throughout a network.

In a sample implementation, the access point 104 comprises a macrocell and the access points 106-110 comprise femtocells (e.g., some type of small-coverage access point that has lower transmit power than a macro access point). The femtocells may be associated with one another in certain deployments (e.g., in an enterprise or other multi-femtocell deployment). The femtocells may transmit beacon signals on macrocell frequencies to redirect idle-mode devices (e.g., the access terminal 102) to a serving frequency of the femtocells.

As used herein a beacon signal of a femtocell is communication network signal comprising a known sequence (e.g., a pilot signal) that is transmitted on a frequency other than the frequency of the current forward link of the femtocell. Typically, a beacon signal is transmitted on an intermittent (e.g., periodic) basis. In some implementations, a beacon signal is implemented as a channel (e.g., BCCH in GSM, BCH[PCCPCH] in UMTS, and broadcast control channel and pilot channel in CDMA).

To mitigate interference that beacon signal transmissions by femtocells may have on macrocell communications, the femtocells may employ periodic beacon signal transmission patterns. Thus, an idle-mode device that wakes up according to a wake-up scheme (e.g., based on a control channel offset) to receive signals on the macrocell frequency, may receive a beacon signal from a femtocell within a specified period of time associated with femtocell discovery. The femtocells also may be configured to transmit opportunistic beacon signals to a device (e.g., the access terminal 102) for which a registration request, out-of-band discovery, or some other communication is detected. In either of the above cases, an idle-mode device may miss the beacon signal from a first femtocell if the device moves to another femtocell before the first femtocell transmits its periodic beacon signal.

For example, access terminals in a cdma 1xEV-DO system wake up periodically at different control channel (CC) offsets to search for beacon signals. The DO beacon pattern is thus designed such that all CC offsets are covered within a targeted discovery time to ensure beacon discovery by all idle access terminals. However, if the beacon patterns across femtocells in a cluster are not synchronized, the discovery time of a user moving from one femtocell to another can be impacted. This is because the access terminal wakes up on a particular CC offset and the beacon pattern is designed to cover this offset within the targeted discovery time, starting from the time the access terminal enters the coverage area of the femtocells. Thus, as the access terminal moves from one femto to another, the total time since the access terminal entered the cluster to the time the access terminal discovers the beacon in the worst case can be equal to (the number of femtocells crossed)*(the target discovery time) if the beacon scheduling is not synchronized.

As another example, in a deployment that employs an opportunistic beacon scheme, an access terminal that registers on cdma2000 1x on one of the femtocells triggers the opportunistic beacon of that femtocell. However, there is some delay associated with the discovery through the opportunistic beacon. If the access terminal now moves into the coverage area of another femtocell within this delay period, the access terminal will not register again on the 1x side at the new femtocell. As a result, a new opportunistic beacon will not be triggered at the target femtocell, thereby impacting discovery time of mobile femtocell users. A similar problem may occur when other indicators are used to identify new user arrival if the triggering only occurs once when entering a femtocell cluster.

In accordance with the teachings herein, beacon synchronization is employed to enable an idle-mode device to receive a beacon signal from one or more femtocells in an enterprise or other clustered deployment within a specified time period. For example, beacon signals may be synchronized across the femtocells in the deployment such that each femtocell transmits a beacon signal according to a similar pattern (e.g., at the same CC offset, on the same frequency, and at the same time). By doing so, the beacon scheduling characteristics become equivalent to a single beacon covering the entire cluster and the discovery time is not impacted. This can ensure that an idle-mode device receives the beacon signal during the assigned time period regardless of whether the device moves between coverage of the femtocells in the deployment.

In a deployment that employs an opportunistic beacon scheme, opportunistic beacon control is maintained on an enterprise or femtocell cluster level, instead of at a femtocell level. The opportunistic beacon is transmitted by all femtocells in a synchronized manner as discussed above. Thus, the entire cluster is effectively treated as a large femtocell. For example, any users entering the enterprise will register once on 1x and this triggers an opportunistic beacon on all DO femtocells in a synchronized manner (i.e. transmit on the same CC offset on the same frequency at the same time). This enterprise (or cluster) level control extends to other aspects of the opportunistic beacon as well. For example, opportunistic beacons on all femtocells may be shut down if the access terminal registers on any femtocell, any timers (e.g., timeout timers) associated with control of opportunistic beacon transmission may be maintained on an enterprise-wide level and effect opportunistic beacons on all femtocells, etc. By doing this, the discovery time characteristics become equivalent to a single femtocell operating to cover the entire enterprise.

In some embodiments, only a portion of the femtocells are selected to transmit synchronized beacon signals based at least in part on the location of the access terminal. In this way, the amount of interference imparted on macrocell communication may be further reduced. Furthermore, access terminal mobility may be tracked through probing or some other suitable method. This tracking may be in the form of, for example, periodic 1x registration requests sent by the femtocells in the cluster to all the access terminals currently registered on the cluster. Based on this information, the opportunistic beacon can be transmitted only by a subset of the femtocells within which the access terminals are likely to be in coverage. This subset of the femtocells of the set will then transmit their beacon signals in a synchronized manner as discussed herein.

Figure 2:
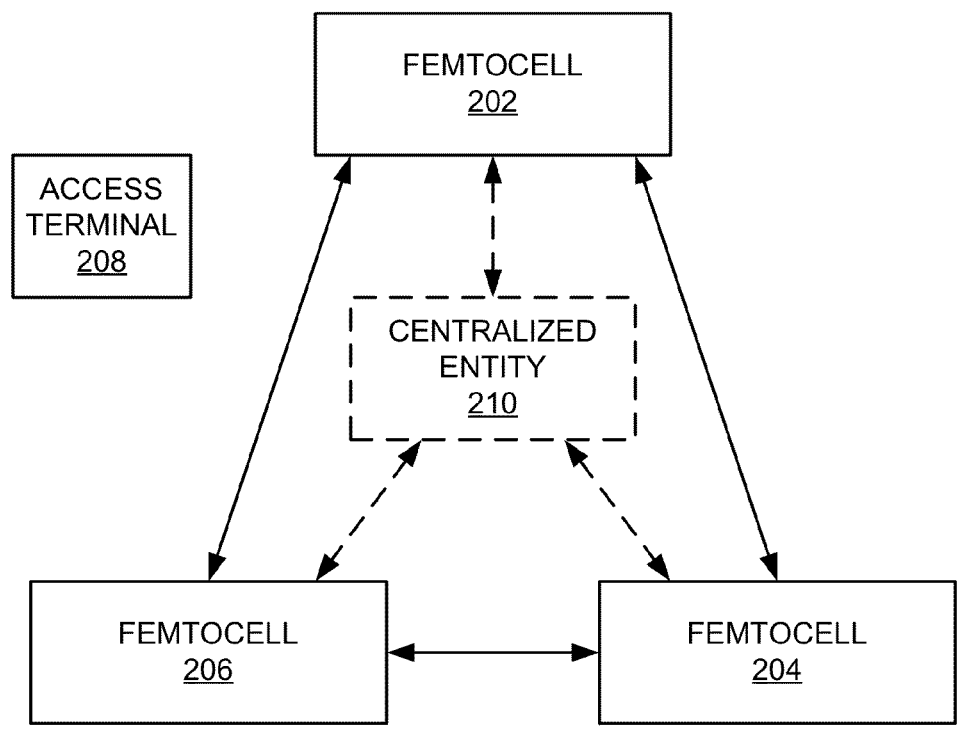
FIG. 2 is a simplified block diagram of several sample aspects of a communication system including femtocells and, optionally, a centralized entity.

Referring to FIG. 2, a wireless communication system 200 is illustrated that facilitates transmitting synchronized beacon signals to ensure receipt by idle-mode access terminals. The system 200 includes femtocells 202, 204, and 206 that may provide one or more access terminals, such as an access terminal 208, with access to a wireless network and/or other communication services. For example, the femtocells 202, 204, and 206 may operate in an enterprise or other multiple femtocell deployment (e.g., utilizing a single system identifier (SID) and/or network identifier (NID), etc.) to provide similar services to one or more access terminals. Moreover, the femtocells 202, 204, and 206 may communicate with one another over backhaul link connections in a network (e.g., an enterprise network). The system 200 may optionally include a centralized entity 210 that may coordinate one or more parameters among the femtocells 202, 204, and 206. In practice, the entities represented by the femtocells 202, 204, and 206 may take the form of femtocell access points, picocell access points, or other similar small-coverage access points. In addition, the access terminal 208 may be a UE, a modem (or other tethered device), a portion thereof, and/or substantially any device that wirelessly communicates with one or more femtocells, macrocell access points, etc. The centralized entity 210 may be a femtocell management system, a femtocell cluster controller, a server, another femtocell, and/or substantially any device that may communicate with the femtocells 202, 204, and 206.

According to an example, the access terminal 208 may be camped on a macrocell (not shown) in idle-mode such that the access terminal 208 activates a receiver periodically to obtain signals. As described, the femtocells 202, 204, and 206 may transmit beacon signals over the macrocell serving frequency to redirect idle-mode access terminals to a serving frequency of the femtocells 202, 204, or 206. The femtocells 202, 204, and 206 may synchronize their beacon signals such that the access terminal 208 may obtain a beacon signal from at least one of the femtocells 202, 204, or 206 upon activating or switching-on a receiver. For example, the femtocells 202, 204, and 206 may synchronize the beacon signals in given time periods to ensure that the access terminal 208 receives a beacon signal within a certain period of time. In a specific example, in 1xEV-DO, access terminals in idle-mode may activate a receiver (e.g., wake-up) to receive one or more signals every 12 control channels (e.g., every 5.12 seconds). Thus, the femtocells 202, 204, and 206 may transmit synchronized beacon signals to ensure that the access terminal 208 receives a beacon signal within a given period of time (given the 12 control channel offset). In this regard, even where the access terminal 208 moves within coverage of other femtocells within the deployment, the access terminal 208 may receive the beacon signal from at least one of the femtocells in the deployment within the given period of time.

The femtocells 202, 204, and 206 may communicate with one another to determine when to transmit the synchronized beacon signals, and/or may communicate with a centralized entity 210 to specify and/or receive timing information for transmitting the synchronized beacon signals. For example, in either case, the femtocell 202 may determine a pattern for transmitting synchronized beacon signals. In one example, the pattern is determined based on the 1xEV-DO standard. Thus, the femtocell 202 may notify the femtocells 204 and 206 of the pattern for transmitting the synchronized beacon signals over backhaul links, or may notify the centralized entity 210, which may in turn notify the femtocells 204 and 206. In any case, the femtocells 202, 204, and 206 are provisioned with beacon transmission parameters that enable the femtocells to transmit beacon signals in a synchronized manner. The access terminal 208 may thus receive a beacon signal from at least one of the femtocells 202, 204, or 206 upon switching on a receiver within a designated period of time.

Figure 3:
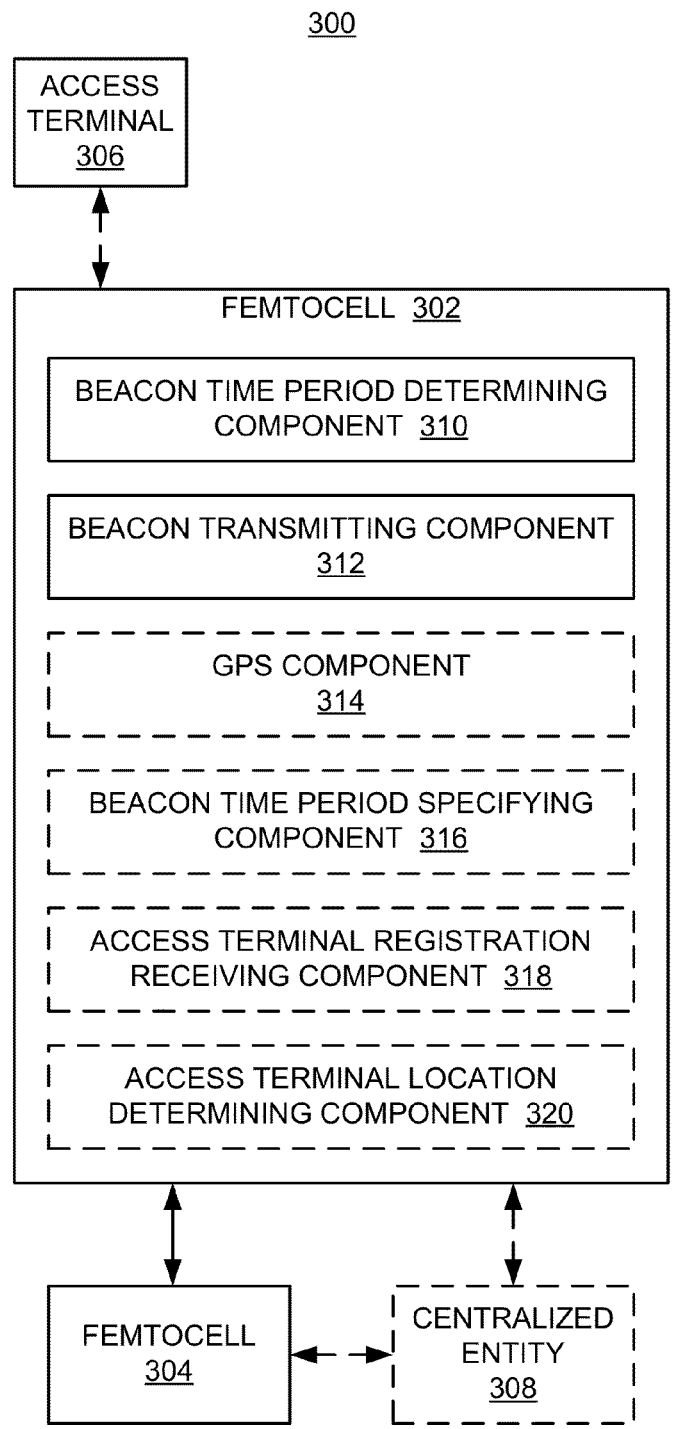
FIG. 3 is a simplified block diagram illustrating several sample components of a femtocell.

Referring to FIG. 3, an example wireless communication system 300 that facilitates transmitting synchronized beacon signals among femtocells in a deployment is illustrated. In a similar manner as discussed above at FIG. 1, the system 300 includes femtocells 302 and 304 that provide one or more access terminals, such as access terminal 306, with access to a wireless network or other communication services. In addition, a centralized entity 308 may optionally coordinate one or more parameters among the femtocells 302 and 304. The femtocell 304 and/or centralized entity 308 may include similar components as the femtocell 302 to provide similar functionalities, as described herein.

The femtocell 302 may comprise a beacon time period determining component 310 that may discern a time period for transmitting a beacon signal that may be synchronized with one or more beacon signals from other femtocells in a similar deployment, and a beacon transmitting component 312 that may transmit the beacon signal. The femtocell 302 may optionally comprise a global positioning system (GPS) component 314 or some other suitable component for providing a time reference for synchronizing beacon signals, a beacon time period specifying 316 that may indicate a time period for transmitting a synchronized beacon signal to one or more other femtocells, an access terminal registration receiving component 318 that may obtain a registration request from an idle-mode access terminal, and/or an access terminal location determining component 320 that receives or otherwise computes a position of an access terminal.

According to an example, the beacon time period determining component 310 may receive or otherwise determine a time period for synchronously transmitting one or more beacon signals with the femtocell 304. In one example, the beacon time period determining component 310 may receive an indication of the time period from the femtocell 304, from the centralized entity 308, and/or from some other entity. In another example, the beacon time period determining component 310 may discern the time period based at least in part on a beacon transmission pattern specified at least in part by a network standard (e.g., 1xEV-DO). In any case, the beacon transmitting component 312 may transmit the beacon signal over the specified time period to provide synchronous beacon signal transmission as described herein. In one example, the femtocell 302 may utilize the GPS component 314 as a time reference for transmitting the beacon signal.

Moreover, in an example where the beacon time period determining component 310 discerns the time period, the beacon time period specifying component 316 may indicate the time period to the femtocell 304 over a backhaul link, or to the centralized entity 308, which may in turn notify the femtocell 304. For example, this may involve the beacon time period specifying component 316 sending an indication to the femtocell 304 and/or to the centralized entity 308 of: the beacon time period, the beacon signal transmission pattern, and/or other beacons transmission parameters. In either case, the femtocell 304 may receive this information and accordingly transmit the beacon signal in synchronization with the beacon signal transmissions of the femtocell 302. Thus, beacon scheduling characteristics may be similar across the femtocells 302 and 304 covering an entire enterprise or other deployment, and thus, the discovery time for a moving access terminal is not adversely impacted.

In one example, the access terminal 306 may be camped on a macrocell (not shown) in idle-mode. Thus, the access terminal 306, upon moving within range of the femtocell 302 or 304 may receive the synchronized beacon signal from at least one of the femtocells 302 or 304, which may ensure that the access terminal 306 receives a beacon signal during a given control channel cycle when the access terminal 306 periodically wakes up its receiver. In another example, the access terminal 306 may request registration (e.g., 1x registration) from the femtocell 302. The access terminal registration receiving component 318 may obtain the registration request, and the beacon time period determining component 310 may discern a time period for transmitting an opportunistic beacon signal to the access terminal 306 based at least in part on the request (e.g., in a subsequent time period), and the beacon time period specifying component 316 may indicate the time period for synchronously transmitting the opportunistic beacon to the access terminal 306 to the femtocell 304. In another example, the beacon time period specifying component 316 may indicate the time period to the centralized entity 308 which then provides this information to the femtocell 304. Alternatively, or in addition, the centralized entity 308 may determine the time period and provide the time period to the femtocells 302 and 304. Moreover, beacon signal transmission patterns may be provided to one or more of the femtocell 302, the femtocell 304, or the centralized entity 308. In any case, the transmission of synchronized beacon signals may ensure that the access terminal 306 receives the beacon from at least one of the femtocell 302 or 304 during a discovery time, irrespective of whether the access terminal 306 moves within coverage of the femtocell 304. In addition, in cases where the access terminal 306 registers with the femtocell 302, the access terminal registration receiving component 318 may notify the femtocell 304 and/or centralized entity 308 to not transmit the beacon signal for the access terminal 306.

The access terminal location determining component 320 may detect at least an approximate location of the access terminal 306. For example, the access terminal location determining component 320 may communicate with (e.g., transmit cdma 1x registration requests to) the access terminal 306. Depending on the response, the access terminal location determining component 320 may discern whether the access terminal 306 is likely within coverage of the femtocell 302. If so, the beacon transmitting component 312 may transmit a beacon signal over the appropriate time period. This may mitigate interference to one or more macrocells since only those femtocells within range of the access terminal that responded to the registration request (as opposed to all femtocells in the deployment) may transmit the synchronous beacon signals.

Sample operations that may be employed in accordance with the teachings herein will now be described in more detail in conjunction with the flowcharts of FIGS. 4-8. For convenience, the operations of FIGS. 4-8 (or any other operations discussed or taught herein) may be described as being performed by specific components (e.g., components of FIG. 1, FIG. 2, FIG. 3, FIG. 9, etc.). It should be appreciated, however, that these operations may be performed by other types of components and may be performed using a different number of components. It also should be appreciated that one or more of the operations described herein may not be employed in a given implementation.

Figure 4:
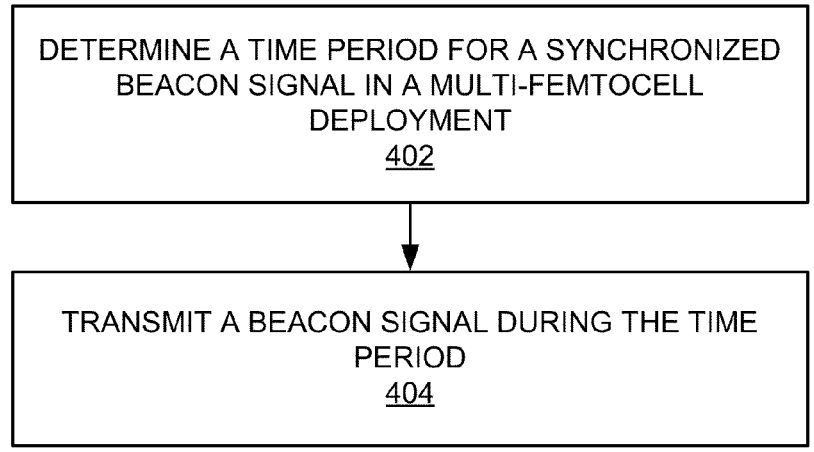
FIG. 4 is a flowchart of several sample aspects of operations that may be performed in conjunction with a synchronized beacon signal transmission scheme.

Referring initially to FIG. 4, an example methodology that facilitates transmitting a synchronous beacon signal is illustrated. As represented by block 402, a time period for a synchronized beacon signal may be determined in a multi-femtocell deployment. As described, this may include receiving the time period from one or more femtocells or a centralized entity (e.g., as part of a beacon transmission pattern or otherwise), determining the time period or beacon transmission pattern for a device according to a network specification, configuration, hardcoding, etc., and/or the like. In addition, the determination of the time period may be based at least in part on receiving a registration request from an access terminal. As represented by block 404, a beacon signal is transmitted during the appropriate time period. In this regard, other femtocells will transmit beacon signals in the same time period to provide synchronized transmission thereof.

Figure 5:
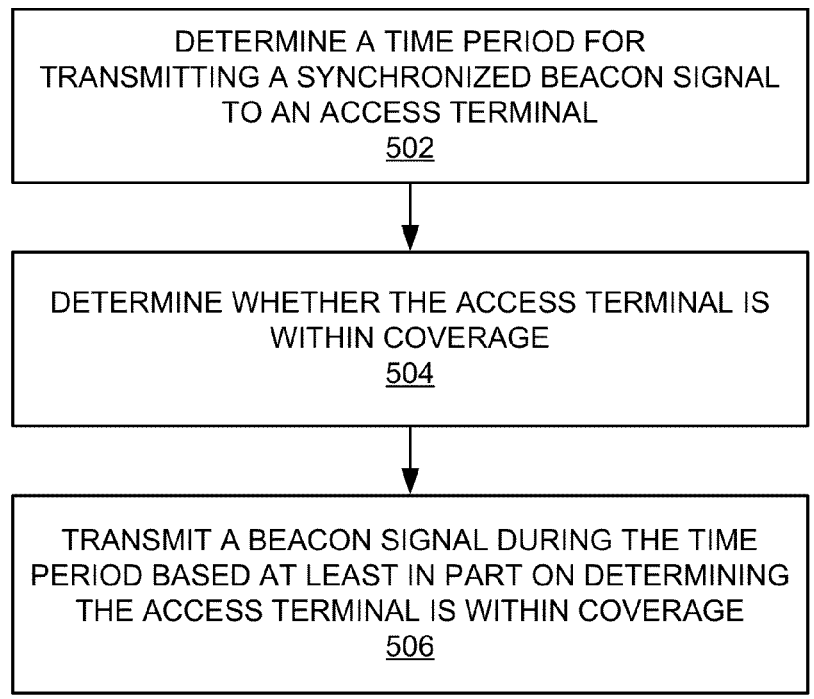
FIG. 5 is a flowchart of several sample aspects of operations that may be performed in conjunction with transmitting beacon signals to a device determined to be within coverage.

Referring to FIG. 5, an example methodology that facilitates transmitting a beacon signal based at least in part on a position of an access terminal is illustrated. As represented by block 502, a time period for transmitting a synchronized beacon signal to an access terminal is determined. For example, this may include receiving the time period, determining the time period based at least in part on receiving a registration request from the access terminal, and so on as discussed herein. As represented by block 504, a determination is made as to whether the access terminal is within coverage. This may be determined based at least in part on a position of the access terminal, which may be received or otherwise approximated as described (e.g., according to transmitting registration requests to the access terminal, etc.). As represented by block 506, a beacon signal is transmitted during the appropriate time period based at least in part on that determination that the access terminal is within coverage. Thus, for example, some femtocells that do not potentially cover the access terminal may refrain from transmitting the synchronized beacon signal to minimize interference in one or more macrocells.

Figure 6:
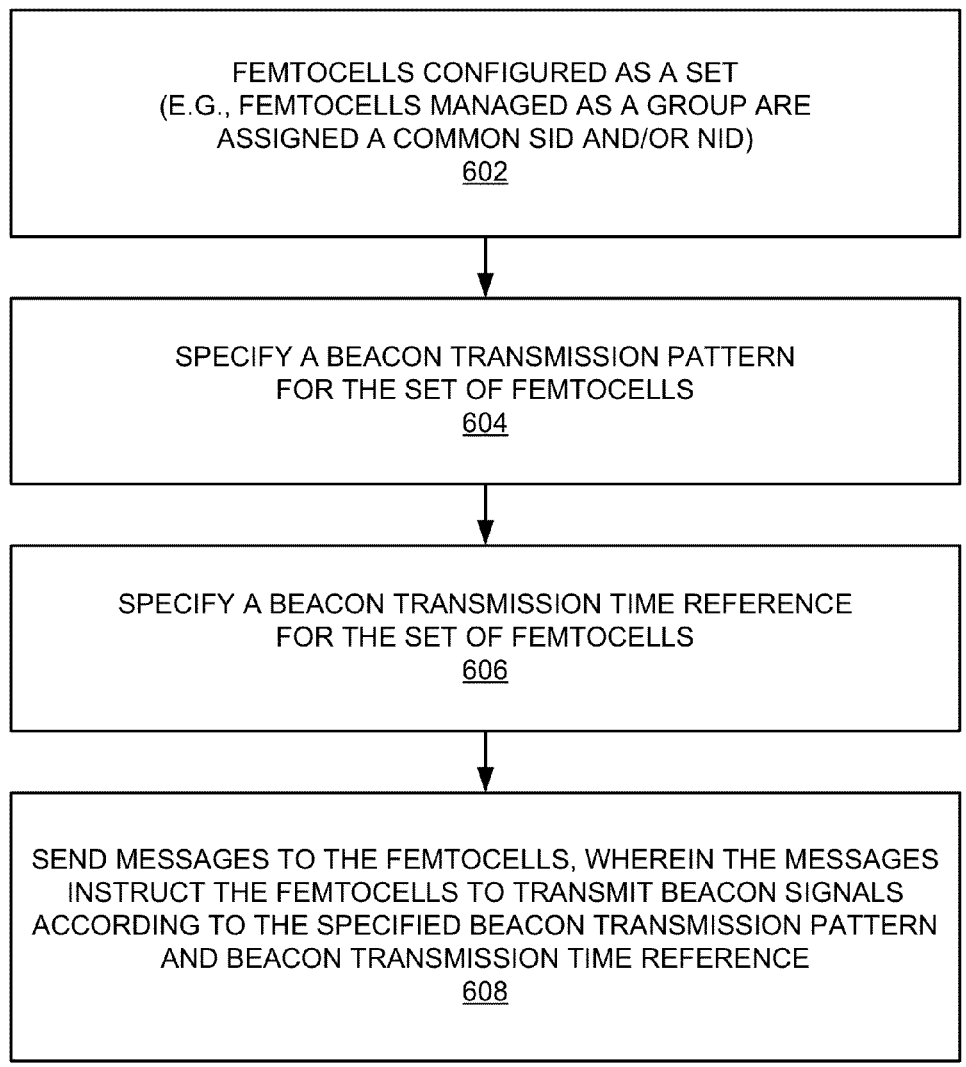
FIG. 6 is a flowchart of several sample aspects of operations that may be performed to synchronize beacon signal transmissions of a set of femtocells.

FIG. 6 describes in more detail several operations that may be performed by a configuration entity that configures a set of femtocells to transmit beacon signals in a synchronized manner. Such an entity may take the form of or be implement in, for example, one or more of a femtocell management system, a femtocell cluster controller, a configuration server, one of the femtocells of the set, or some other suitable network entity.

As represented by block 602, at some point in time several femtocells are configured as a set. For example, a set of femtocells may be deployed together (e.g., in an enterprise environment) and configured to be controlled by the same entity. As discussed herein, the femtocells of the set may be assigned a common (i.e., the same) NID and/or a common SID.

As represented by block 604, the configuration entity specifies a beacon transmission pattern for the set of femtocells. That is, the configuration entity determines the beacon transmission pattern that is to be used by each of the femtocells of the set for transmitting beacon signals. This beacon transmission pattern may specify, for example, when (e.g., which control channel cycle) and where (e.g., on which frequency or frequencies) the beacon signals are to be transmitted.

As represented by block 606, the configuration entity specifies a beacon transmission time reference for the set of femtocells. That is, the configuration entity determines the beacon transmission time reference that is to be used by each of the femtocells of the set for transmitting beacon signals. This time reference may be indicative of, for example, a time at which the femtocells are to commence transmitting beacons according to the beacon transmission pattern. In some implementations, the time reference comprises a system time offset. In some implementations (e.g., a cdma 1xEV-DO deployment), the time reference comprises a control channel offset.

As represented by block 608, the configuration entity sends messages to the femtocells, wherein the messages instruct the femtocells to transmit beacon signals according to the specified beacon transmission pattern and beacon transmission time reference. In a typical implementation, a message of a specified type or comprising a specified type of field may be used here, whereby the specified type will indicate to a femtocell that receives the message that the message includes the beacon transmission pattern and the beacon transmission time reference that is to be used by the femtocell. In some implementations, the messages instruct the femtocells to transmit beacon signals in synchronization on a plurality of frequencies.

Figure 7:
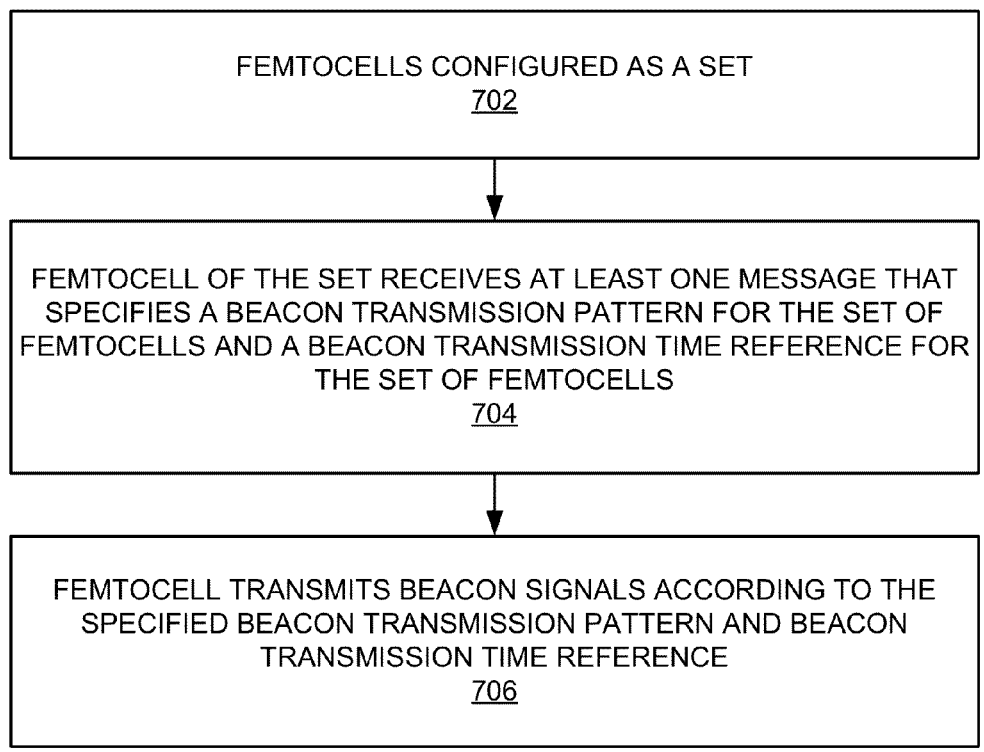
FIG. 7 is a flowchart of several sample aspects of operations that may be performed to transmit beacon signals in synchronization with a set of femtocells.

FIG. 7 describes several operations that may be performed by each femtocell that receives one of the messages sent at block 608. Block 702 again represents that at some point in time several femtocells are configured as a set (e.g., as described above at block 602). The femtocell referred to at blocks 704 and 706 is a member of this set.

As represented by block 704, a femtocell receives at least one message that specifies the beacon transmission pattern for the set of femtocells and the beacon transmission time reference for the set of femtocells.

As represented by block 706, the femtocell then transmits beacon signals according to the specified beacon transmission pattern and beacon transmission time reference. That is, the femtocell will commence transmitting beacon signals on the appropriate frequency or frequencies and using the specified beacon transmission pattern at a time indicated by the beacon transmission time reference.

Figure 8:
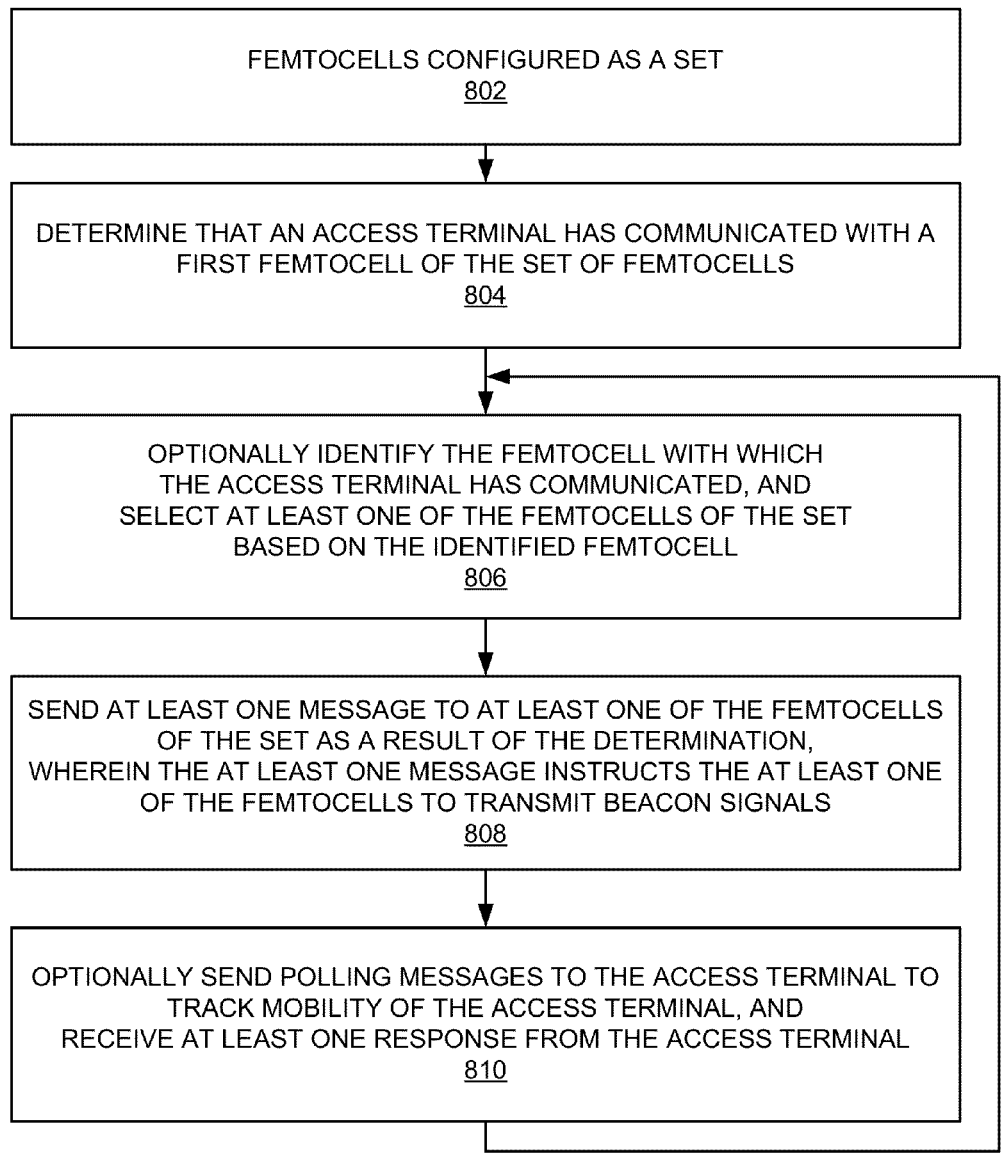
FIG. 8 is a flowchart of several sample aspects of operations that may be performed to control which femtocell(s) of a set of femtocells will transmit beacon signals.

FIG. 8 illustrates sample operations that may be performed to support an opportunistic beacon transmission scheme for a set of femtocells that transmit synchronized beacon signals. In a typical implementation, this scheme controls the transmission of beacon signals associated with a first type of wireless communication technology by the femtocell based on whether an access terminal has communicated with one of the femtocells of the set using a second type of wireless communication technology. For example, an access terminal may be able to discover a femtocell of the set more quickly using the second type of wireless communication technology. As a specific example, cdma 1x beacons may employ a shorter time between beacons than 1xEV-DO beacons. Hence, an access terminal may be able to more quickly discover a femtocell's transmission of 1x beacons as opposed to the femtocell's transmission of 1xEV-DO beacons.

Moreover, sending beacon signals using the first type of wireless communication technology may cause unwanted interference (e.g., on a macrocell network). Consequently, it may be desirable to employ an opportunistic beacon scheme whereby the femtocells refrain from transmitting beacon signals using the first type of wireless communication technology until it has been determined that an access terminal is in the vicinity of the set of femtocell (e.g., as indicated by the access terminal communicating with one of the femtocells via the second type of wireless communication technology).

Furthermore, to further reduce the interference caused by beacon signal transmissions, the number of femtocells of the set that are allowed to transmit beacons may be restricted based on the location of the access terminal. For example, only those femtocells in close proximity to the access terminal (e.g., the femtocells that are able to service the access terminal) may be instructed to transmit beacons. Here, the location of the access terminal may be determined based on which femtocell is able to communicate with the access terminal.

The operations of FIG. 8 may be performed, for example, by a configuration entity as discussed herein, by one or more femtocells of the set, or by a combination of these entities. Block 802 again represents that at some point in time several femtocells are configured as a set (e.g., as described above at block 602).

As represented by block 804, at some point in time a determination is made that an access terminal has communicated with a first femtocell of the set (i.e., any one of the femtocells of the set). For example, the access terminal may communicate with the femtocell via cdma2000 1x technology (e.g., by registering with the femtocell), via some other cellular (e.g., 3G or 4G) technology, via Bluetooth technology, via Wi-Fi technology, or via some other suitable communication technology.

As represented by block 806, in implementations where the number of femtocells that will transmit the opportunistic beacon signals is restricted, the femtocell with which the access terminal has communicated is identified. At least one of the femtocells of the set is then selected for transmitting the opportunistic beacon signals based on the identified femtocell. For example, the identified femtocell and, optionally, one or more of its neighbor femtocells may be selected here.

As represented by block 808, as a result of the determination of block 804 (and, optionally block 806), at least one message is sent to at least one of the femtocells of the set, whereby the message(s) instructs the femtocell(s) to transmit beacon signals. As discussed herein, the message(s) may specify a beacon transmission pattern for the set of femtocells and a beacon transmission time reference for the set of femtocells so that the designated femtocells will transmit their beacon signals in a synchronized manner. Upon receipt of such a message (or messages), a femtocell will commence beacon transmission via the first wireless communication technology until the access terminal registers using the first wireless communication technology or until a timeout occurs.

As represented by block 810, once an access terminal has been identified as being within the coverage of the femtocells (e.g., once the access terminal has registered with one of the femtocells), the location of the access terminal may be tracked. For example, the femtocells in the set may send polling messages to the access terminal (e.g., requesting registration) to track the mobility of the access terminal. In response to the polling messages, one or more of the femtocells of the set may receive a response from the access terminal. Thus, the operations of block 810 may correspond to one form of the operations of block 804 (i.e., determining that the access terminal has communicated with a femtocell of the set). The operational flow may thus return back to blocks 806 and 808 so that the appropriate femtocells will be configured to transmit beacon signals (e.g., cdma 1xEV-DO beacon signals).

Figure 9:
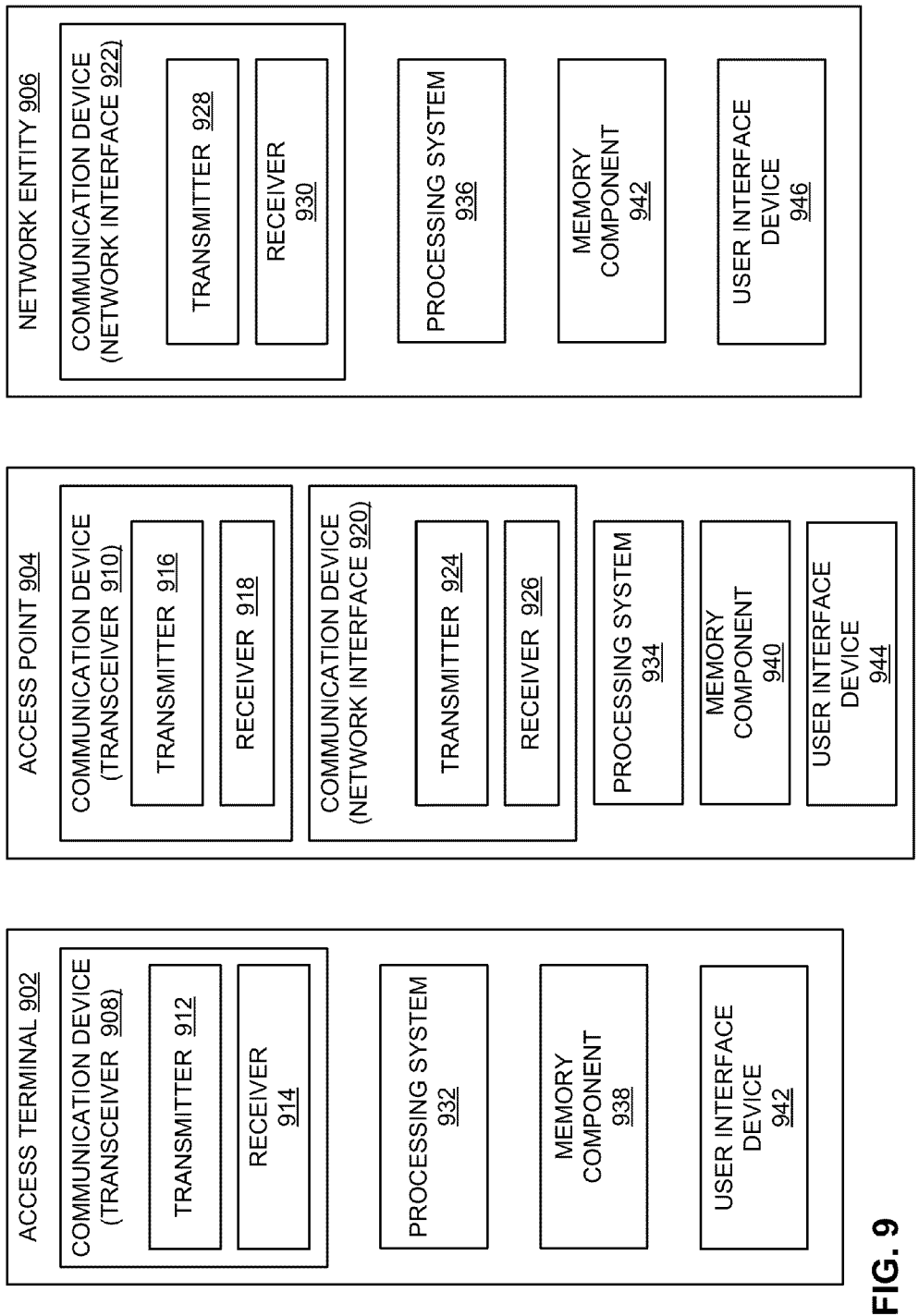
FIG. 9 is a simplified block diagram of several sample aspects of components that may be employed in communication nodes.

FIG. 9 illustrates several sample components (represented by corresponding blocks) that may be incorporated into nodes such as an access terminal 902, an access point 904, and a network entity 906 (e.g., corresponding to the access terminal 102, the access points 106-110, and the network entity 112, respectively, of FIG. 1) to perform beacon transmit control-related operations as taught herein. The described components also may be incorporated into other nodes in a communication system. For example, other nodes in a system may include components similar to those described for one or more of the access terminal 902, the access point 904, or the network entity 906 to provide similar functionality. Also, a given node may contain one or more of the described components. For example, an access point may contain multiple transceiver components that enable the access point to operate on multiple carriers and/or communicate via different technologies.

As shown in FIG. 9, the access terminal 902 and the access point 904 each include one or more wireless communication devices (as represented by a transceiver 908 and a transceiver 910, respectively) for communicating with other nodes. Each transceiver 908 includes a transmitter 912 for sending signals (e.g., messages, indications, and other types of information) and a receiver 914 for receiving signals (e.g., messages, FL signals, pilot signals, beacon signals, and other types of information). Similarly, each transceiver 910 includes a transmitter 916 for sending signals (e.g., messages, indications, FL signals, pilot signals, beacon signals, and other types of information) and a receiver 918 for receiving signals (e.g., messages and other types of information).

The access point 904 and the network entity 906 each include one or more communication devices (as represented by a network interface 920 and a network interface 922, respectively) for communicating with other nodes (e.g., other network entities). For example, the network interfaces 920 and 922 may be configured to communicate with one or more network entities via a wire-based or wireless backhaul or backbone. In some aspects, the network interfaces 920 and 922 may comprise transmitter and receiver components configured to support wire-based communication (e.g., non-RF-based communication) or wireless communication (e.g., RF-based communication). This communication may involve, for example, sending and receiving: messages, indications, parameters, other types of information, and so on). Accordingly, in the example of FIG. 9, the network interface 920 is shown as comprising a transmitter 924 for sending signals and a receiver 926 for receiving signals. Similarly, the network interface 922 is shown as comprising a transmitter 928 for sending signals and a receiver 930 for receiving signals.

The access terminal 902, the access point 904, and the network entity 906 also include other components that may be used to support beacon transmit control-related operations as taught herein. For example, the access terminal 902 includes a processing system 932 for providing functionality relating to processing beacons and for providing other processing functionality. Similarly, the access point 904 includes a processing system 934 for providing functionality relating to controlling beacon transmission (e.g., process received messages and control when beacon signals are transmitted; specify a beacon transmission pattern for a set of femtocells and a beacon transmission time reference for the set of femtocells; generate messages that instruct the femtocells to transmit beacon signals according to the specified beacon transmission pattern and beacon transmission time reference;

receive at least one message that specifies a beacon transmission pattern for a set of femtocells and a beacon transmission time reference for the set of femtocells; control the transmission of beacon signals according to the specified beacon transmission pattern and beacon transmission time reference; determine that an access terminal has communicated with a first femtocell of a set of femtocells; generate at least one message that instructs at least one femtocell to transmit beacon signals) and for providing other processing functionality. Also, the network entity 906 includes a processing system 936 for providing functionality relating to controlling beacon transmission (e.g., control when beacon signals are transmitted; specify a beacon transmission pattern for a set of femtocells and a beacon transmission time reference for the set of femtocells; generate messages that instruct the femtocells to transmit beacon signals according to the specified beacon transmission pattern and beacon transmission time reference; determine that an access terminal has communicated with a first femtocell of a set of femtocells; generate at least one message that instructs at least one femtocell to transmit beacon signals) and for providing other processing functionality. The access terminal 902, the access point 904, and the network entity 906 include memory components 938, 940, and 942 (e.g., each including a memory device), respectively, for maintaining information (e.g., measurement report information, thresholds, parameters, and so on). In addition, the access terminal 902, the access point 904, and the network entity 906 include user interface devices 942, 944, and 946, respectively, for providing indications (e.g., audible and/or visual indications) to a user and/or for receiving user input (e.g., upon user actuation of a sensing device such a keypad, a touch screen, a microphone, and so on).

For convenience the access terminal 902 and the access point 904 are shown in FIG. 9 as including components that may be used in the various examples described herein. In practice, the illustrated blocks may have different functionality in different implementations. For example, the processing systems 932, 934, and 936 will be configured to support different operations in implementations that employ different wireless communication technologies.

The components of FIG. 9 may be implemented in various ways. In some implementations the components of FIG. 9 may be implemented in one or more circuits such as, for example, one or more processors and/or one or more ASICs (which may include one or more processors). Here, each circuit (e.g., processor) may use and/or incorporate data memory for storing information or executable code used by the circuit to provide this functionality. For example, some of the functionality represented by block 908 and some or all of the functionality represented by blocks 932, 938, and 942 may be implemented by a processor or processors of an access terminal and data memory of the access terminal (e.g., by execution of appropriate code and/or by appropriate configuration of processor components). Similarly, some of the functionality represented by block 910 and some or all of the functionality represented by blocks 920, 934, 940, and 944 may be implemented by a processor or processors of an access point and data memory of the access point (e.g., by execution of appropriate code and/or by appropriate configuration of processor components). Also, some or all of the functionality represented by blocks 922, 936, 942, and 946 may be implemented by a processor or processors of a network entity and data memory of the network entity (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macro network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macrocell, and so on. Also, a femto access point may be configured or referred to as a Home NodeB, Home eNodeB, access point base station, femtocell, and so on. In some implementations, a node may be associated with (e.g., referred to as or divided into) one or more cells or sectors. A cell or sector associated with a macro access point, a femto access point, or a pico access point may be referred to as a macro cell, a femtocell, or a picocell, respectively.

Figure 10:
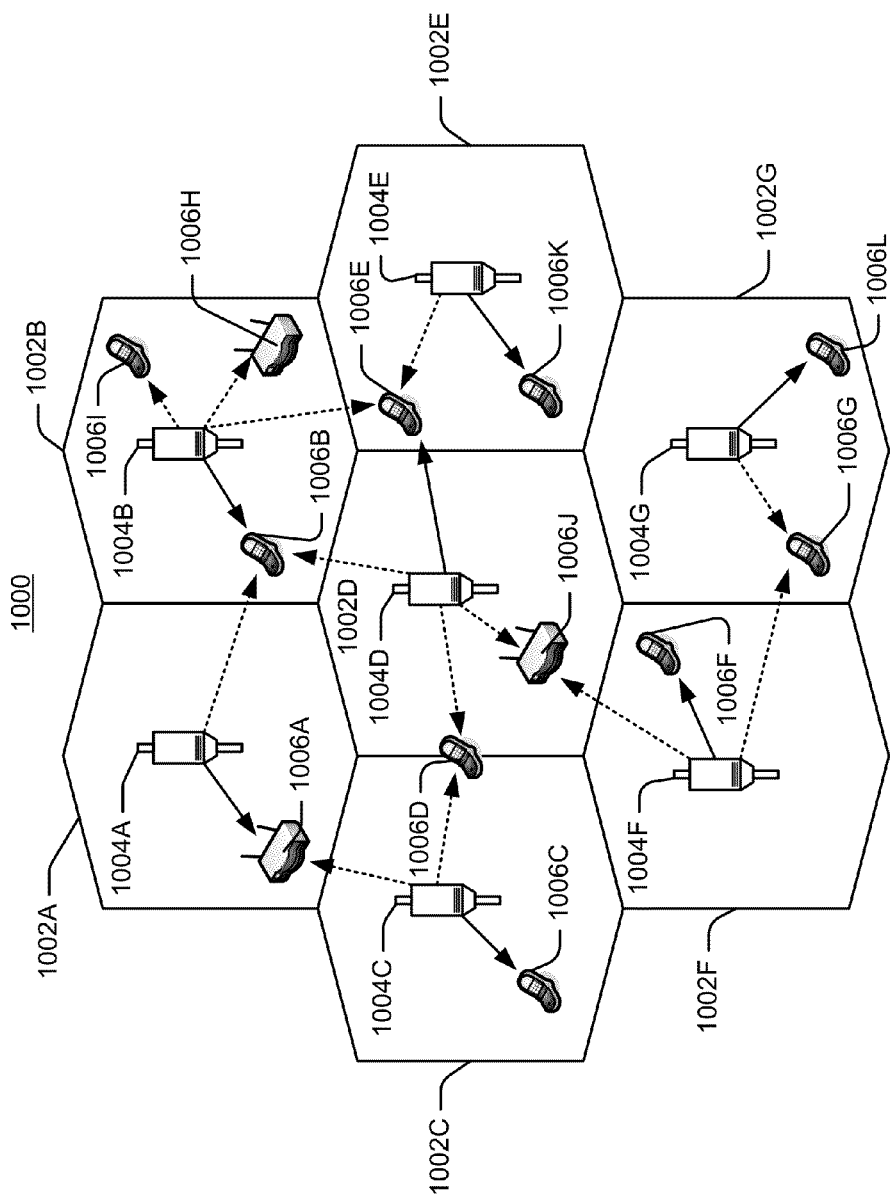
FIG. 10 is a simplified diagram of a wireless communication system.

FIG. 10 illustrates a wireless communication system 1000, configured to support a number of users, in which the teachings herein may be implemented. The system 1000 provides communication for multiple cells 1002, such as, for example, macro cells 1002A-1002G, with each cell being serviced by a corresponding access point 1004 (e.g., access points 1004A-1004G). As shown in FIG. 10, access terminals 1006 (e.g., access terminals 1006A-1006L) may be dispersed at various locations throughout the system over time. Each access terminal 1006 may communicate with one or more access points 1004 on a forward link (FL) and/or a reverse link (RL) at a given moment, depending upon whether the access terminal 1006 is active and whether it is in soft handoff, for example. The wireless communication system 1000 may provide service over a large geographic region. For example, macro cells 1002A-1002G may cover a few blocks in a neighborhood or several miles in a rural environment.

Figure 11:
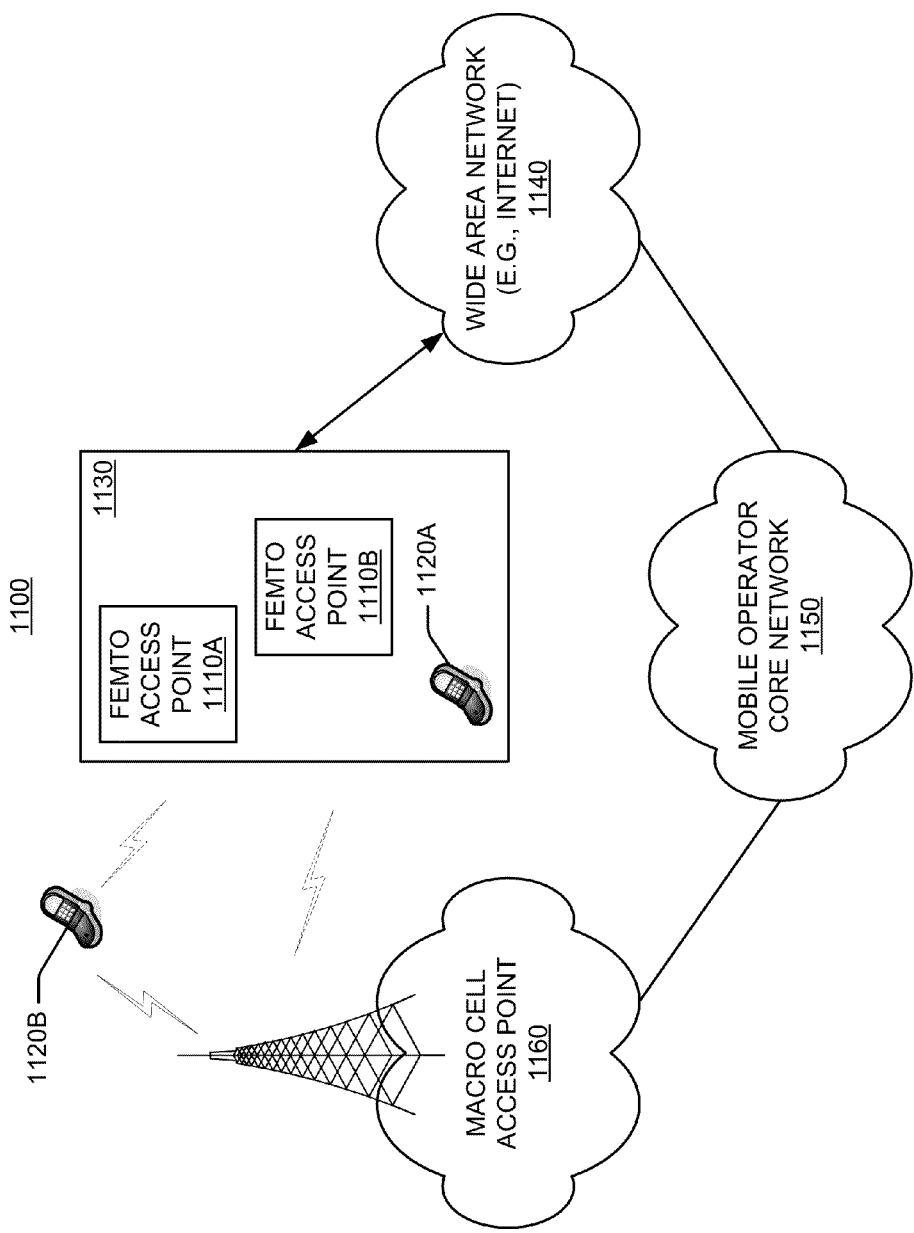
FIG. 11 is a simplified diagram of a wireless communication system including femto nodes.

FIG. 11 illustrates an exemplary communication system 1100 where one or more femto access points are deployed within a network environment. Specifically, the system 1100 includes multiple femto access points 1110 (e.g., femto access points 1110A and 1110B) installed in a relatively small scale network environment (e.g., in one or more user residences 1130). Each femto access point 1110 may be coupled to a wide area network 1140 (e.g., the Internet) and a mobile operator core network 1150 via a DSL router, a cable modem, a wireless link, or other connectivity means (not shown). As will be discussed below, each femto access point 1110 may be configured to serve associated access terminals 1120 (e.g., access terminal 1120A) and, optionally, other (e.g., hybrid or alien) access terminals 1120 (e.g., access terminal 1120B). In other words, access to femto access points 1110 may be restricted whereby a given access terminal 1120 may be served by a set of designated (e.g., home) femto access point(s) 1110 but may not be served by any non-designated femto access points 1110 (e.g., a neighbor's femto access point 1110).

Figure 12:
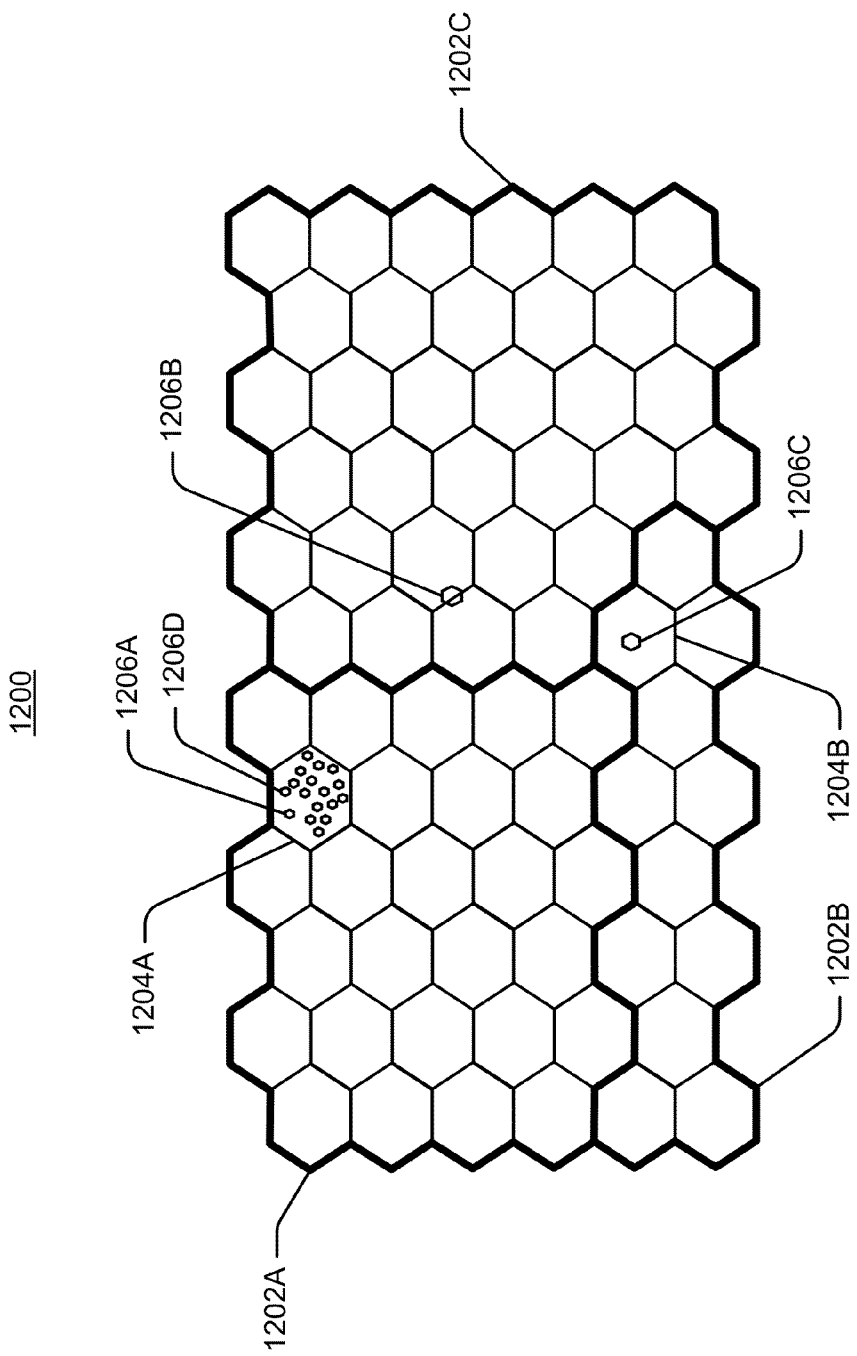
FIG. 12 is a simplified diagram illustrating coverage areas for wireless communication.

FIG. 12 illustrates an example of a coverage map 1200 where several tracking areas 1202 (or routing areas or location areas) are defined, each of which includes several macro coverage areas 1204. Here, areas of coverage associated with tracking areas 1202A, 1202B, and 1202C are delineated by the wide lines and the macro coverage areas 1204 are represented by the larger hexagons. The tracking areas 1202 also include femto coverage areas 1206. In this example, each of the femto coverage areas 1206 (e.g., femto coverage areas 1206B and 1206C) is depicted within one or more macro coverage areas 1204 (e.g., macro coverage areas 1204A and 1204B). It should be appreciated, however, that some or all of a femto coverage area 1206 may not lie within a macro coverage area 1204. In practice, a large number of femto coverage areas 1206 (e.g., femto coverage areas 1206A and 1206D) may be defined within a given tracking area 1202 or macro coverage area 1204. Also, one or more pico coverage areas (not shown) may be defined within a given tracking area 1202 or macro coverage area 1204.

Referring again to FIG. 11, the owner of a femto access point 1110 may subscribe to mobile service, such as, for example, 3G mobile service, offered through the mobile operator core network 1150. In addition, an access terminal 1120 may be capable of operating both in macro environments and in smaller scale (e.g., residential) network environments. In other words, depending on the current location of the access terminal 1120, the access terminal 1120 may be served by a macro cell access point 1160 associated with the mobile operator core network 1150 or by any one of a set of femto access points 1110 (e.g., the femto access points 1110A and 1110B that reside within a corresponding user residence 1130). For example, when a subscriber is outside his home, he is served by a standard macro access point (e.g., access point 1160) and when the subscriber is at home, he is served by a femto access point (e.g., access point 1110A). Here, a femto access point 1110 may be backward compatible with legacy access terminals 1120.

A femto access point 1110 may be deployed on a single frequency or, in the alternative, on multiple frequencies. Depending on the particular configuration, the single frequency or one or more of the multiple frequencies may overlap with one or more frequencies used by a macro access point (e.g., access point 1160).

In some aspects, an access terminal 1120 may be configured to connect to a preferred femto access point (e.g., the home femto access point of the access terminal 1120) whenever such connectivity is possible. For example, whenever the access terminal 1120A is within the user's residence 1130, it may be desired that the access terminal 1120A communicate only with the home femto access point 1110A or 1110B.

In some aspects, if the access terminal 1120 operates within the macro cellular network 1150 but is not residing on its most preferred network (e.g., as defined in a preferred roaming list), the access terminal 1120 may continue to search for the most preferred network (e.g., the preferred femto access point 1110) using a better system reselection (BSR) procedure, which may involve a periodic scanning of available systems to determine whether better systems are currently available and subsequently acquire such preferred systems. The access terminal 1120 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 1110, the access terminal 1120 selects the femto access point 1110 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 1110 that reside within the corresponding user residence 1130). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 13:
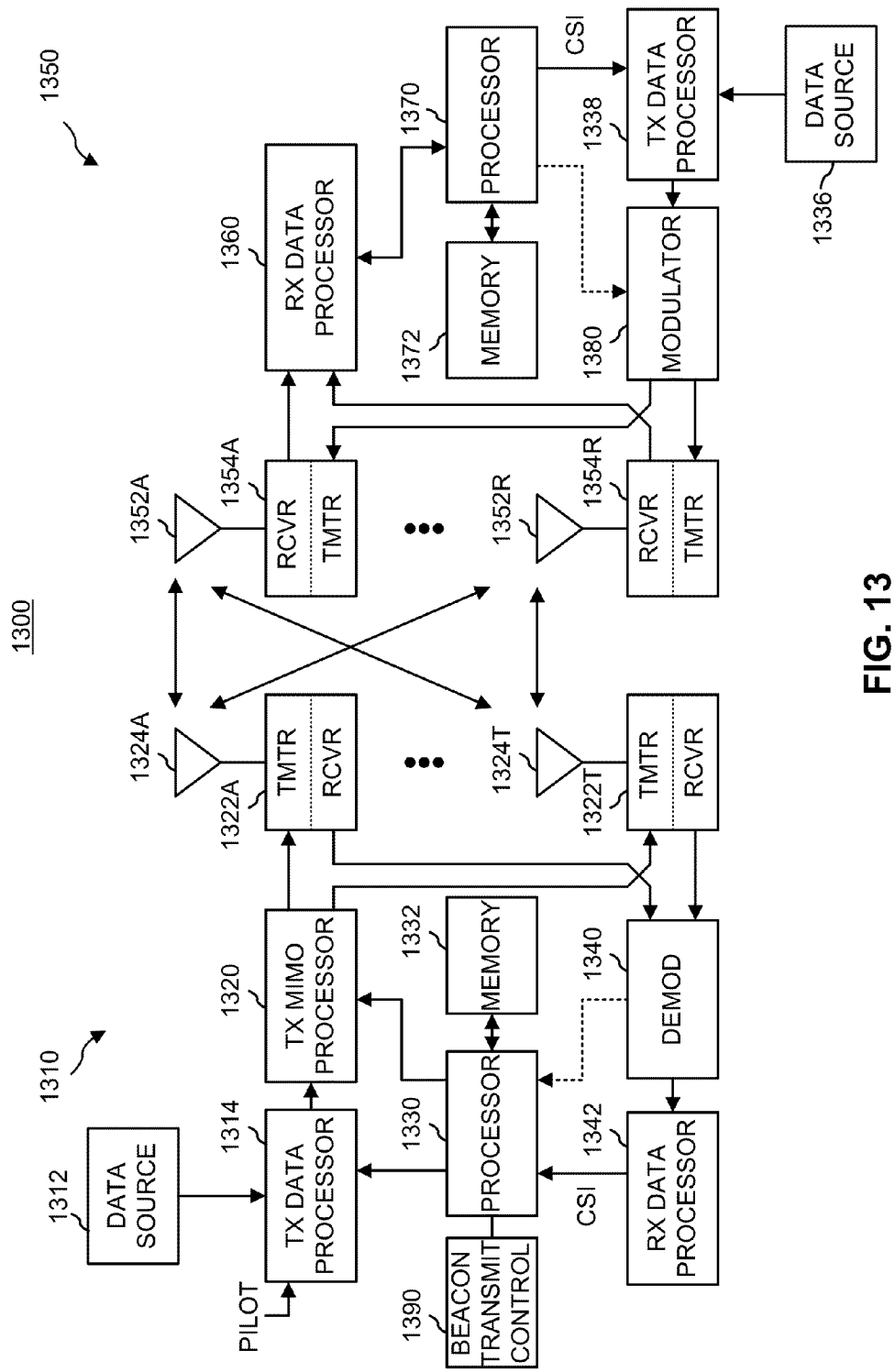
FIG. 13 is a simplified block diagram of several sample aspects of communication components.

FIG. 13 illustrates a wireless device 1310 (e.g., an access point) and a wireless device 1350 (e.g., an access terminal) of a sample MIMO system 1300. At the device 1310, traffic data for a number of data streams is provided from a data source 1312 to a transmit (TX) data processor 1314. Each data stream may then be transmitted over a respective transmit antenna.

The TX data processor 1314 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1330. A data memory 1332 may store program code, data, and other information used by the processor 1330 or other components of the device 1310.

The modulation symbols for all data streams are then provided to a TX MIMO processor 1320, which may further process the modulation symbols (e.g., for OFDM). The TX MIMO processor 1320 then provides $N_T$ modulation symbol streams to $N_T$ transceivers (XCVR) 1322A through 1322T. In some aspects, the TX MIMO processor 1320 applies beam-forming weights to the symbols of the data streams and to the antenna from which the symbol is being transmitted.

Each transceiver 1322 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1322A through 1322T are then transmitted from $N_T$ antennas 1324A through 1324T, respectively.

At the device 1350, the transmitted modulated signals are received by $N_R$ antennas 1352A through 1352R and the received signal from each antenna 1352 is provided to a respective transceiver (XCVR) 1354A through 1354R. Each transceiver 1354 conditions (e.g., filters, amplifies, and downconverts) a respective received signal, digitizes the conditioned signal to provide samples, and further processes the samples to provide a corresponding "received" symbol stream.

A receive (RX) data processor 1360 then receives and processes the $N_R$ received symbol streams from $N_R$ transceivers 1354 based on a particular receiver processing technique to provide $N_T$ "detected" symbol streams. The RX data processor 1360 then demodulates, deinterleaves, and decodes each detected symbol stream to recover the traffic data for the data stream. The processing by the RX data processor 1360 is complementary to that performed by the TX MIMO processor 1320 and the TX data processor 1314 at the device 1310.

A processor 1370 periodically determines which pre-coding matrix to use (discussed below). The processor 1370 formulates a reverse link message comprising a matrix index portion and a rank value portion. A data memory 1372 may store program code, data, and other information used by the processor 1370 or other components of the device 1350.

The reverse link message may comprise various types of information regarding the communication link and/or the received data stream. The reverse link message is then processed by a TX data processor 1338, which also receives traffic data for a number of data streams from a data source 1336, modulated by a modulator 1380, conditioned by the transceivers 1354A through 1354R, and transmitted back to the device 1310.

At the device 1310, the modulated signals from the device 1350 are received by the antennas 1324, conditioned by the transceivers 1322, demodulated by a demodulator (DEMOD) 1340, and processed by a RX data processor 1342 to extract the reverse link message transmitted by the device 1350. The processor 1330 then determines which pre-coding matrix to use for determining the beam-forming weights then processes the extracted message.

FIG. 13 also illustrates that the communication components may include one or more components that perform beacon transmit control operations as taught herein. For example, a beacons transmit control component 1390 may cooperate with the processor 1330 and/or other components of the device 1310 to control beacon transmissions by the device 1310 (e.g., transmissions to another device such as the device 1350) and/or at least one other device as taught herein. It should be appreciated that for each device 1310 and 1350 the functionality of two or more of the described components may be provided by a single component. For example, a single processing component may provide the functionality of the beacon transmit control component 1390 and the processor 1330.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macrocell, a macro node, a Home eNB (HeNB), a femtocell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 14:
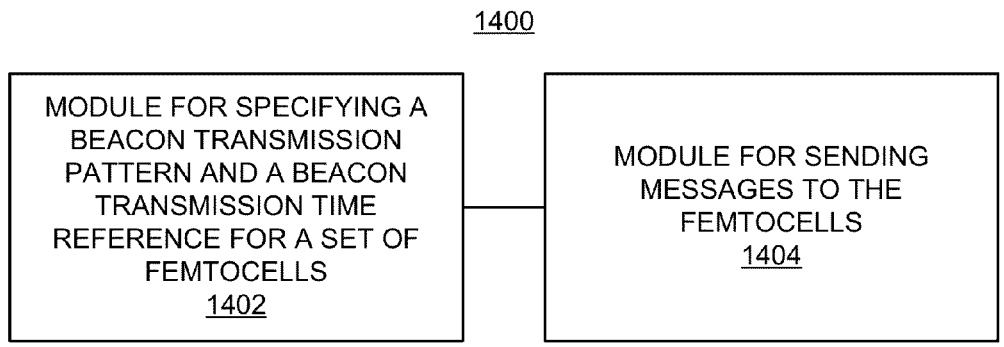
FIGS. 14-16 are simplified block diagrams of several sample aspects of apparatuses configured to support synchronized beacon signal transmission as taught herein.
Figure 15:
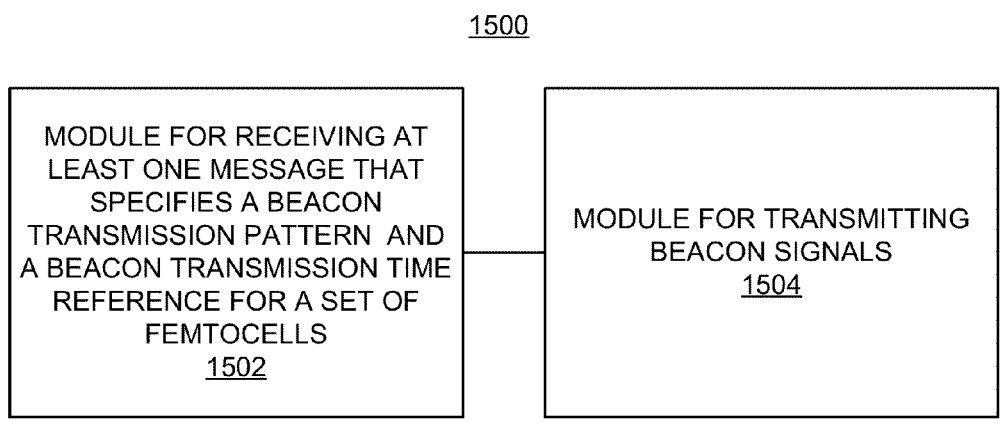
Figure 16:
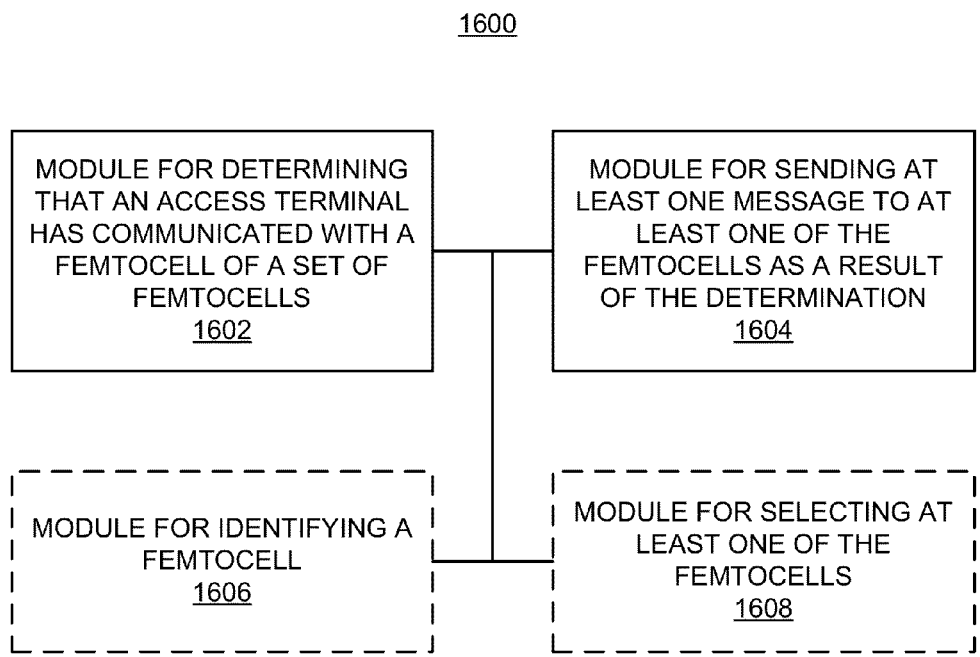

The functionality described herein (e.g., with regard to one or more of the accompanying figures) may correspond in some aspects to similarly designated "means for" functionality in the appended claims. Referring to FIGS. 14, 15, and 16, apparatuses 1400, 1500, and 1600 are represented as a series of interrelated functional modules. Here, a module for specifying a beacon transmission pattern and a beacon transmission time reference for a set of femtocells 1402 may correspond at least in some aspects to, for example, a processing system as discussed herein. A module for sending messages to femtocells 1404 may correspond at least in some aspects to, for example, a communication device as discussed herein. A module for receiving at least one message that specifies a beacon transmission pattern and a beacon transmission time reference for a set of femtocells 1502 may correspond at least in some aspects to, for example, a processing system as discussed herein. A module for transmitting beacon signals 1504 may correspond at least in some aspects to, for example, a communication device as discussed herein. A module for determining that an access terminal has communicated with a femtocell of a set of femtocells 1602 may correspond at least in some aspects to, for example, a processing system as discussed herein. A module for sending at least one message to at least one of the femtocells as a result of the determination 1604 may correspond at least in some aspects to, for example, a communication device as discussed herein. A module for identifying a femtocell 1606 may correspond at least in some aspects to, for example, a processing system as discussed herein. A module for selecting at least one of the femtocells 1608 may correspond at least in some aspects to, for example, a processing system as discussed herein.

The functionality of the modules of FIGS. 14, 15, and 16 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 14, 15, and 16 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media. It should be appreciated that a computer-readable medium may be implemented in any suitable computer-program product.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An apparatus for communication, comprising:
 a processing system configured to specify a beacon transmission pattern for a set of femtocells, a beacon time period for the set of femtocells, and a beacon transmission time reference for the set of femtocells;
 a network entity or femtocell configured to send messages to the set of femtocells, wherein the messages instruct the set of femtocells to transmit beacon signals according to the specified beacon transmission pattern, beacon time period, and beacon transmission time reference;
 and wherein the beacon time periods are synchronized in time across the set of femtocells.

2. The apparatus of claim 1, wherein the beacon transmission time reference is indicative of a time at which the femtocells are to commence transmitting beacons according to the beacon transmission pattern.

3. The apparatus of claim 1, wherein the beacon transmission time reference comprises a control channel offset.

4. The apparatus of claim 1, wherein the set of femtocells are assigned a common system identifier or a common network identifier.

5. The apparatus of claim 1, wherein the messages instruct the femtocells to transmit beacon signals in synchronization on a plurality of frequencies.

6. The apparatus of claim 1, wherein the set of femtocells is based at least in part on the position of an access terminal.

7. The apparatus of claim 1, wherein the messages to the set of femtocells are sent along a backhaul link.

8. A method of communication, comprising:
 specifying a beacon transmission pattern for a set of femtocells, a beacon time period for the set of femtocells, and a beacon transmission time reference for the set of femtocells;
 sending messages to the set of femtocells from a network entity or femtocell, wherein the messages instruct the set of femtocells to transmit beacon signals according to the specified beacon transmission pattern, beacon time period, and beacon transmission time reference;
 and wherein the beacon time periods are synchronized in time across the set of femtocells.

9. The method of claim 8, wherein the beacon transmission time reference is indicative of a time at which the femtocells are to commence transmitting beacons according to the beacon transmission pattern.

10. The method of claim 8, wherein the beacon transmission time reference comprises a control channel offset.

11. The method of claim 8, wherein the set of femtocells are assigned a common system identifier or a common network identifier.

12. The method of claim 8, wherein the messages instruct the femtocells to transmit beacon signals in synchronization on a plurality of frequencies.

13. The method of claim 8, wherein the messages to the set of femtocells are sent along a backhaul link.

14. The method of claim 8, wherein the transmission of the beacon signal is based at least in part on the position of an access terminal.

15. An apparatus for communication, comprising:
 means for specifying a beacon transmission pattern for a set of femtocells, a beacon time period for the set of femtocells, and a beacon transmission time reference for the set of femtocells;
 means for sending messages to the set of femtocells from a network entity or femtocell, wherein the messages instruct the set of femtocells to transmit beacon signals according to the specified beacon transmission pattern, beacon time period, and beacon transmission time reference;
 and wherein the beacon time periods are synchronized in time across the set of femtocells.

16. The apparatus of claim 15, wherein the beacon transmission time reference is indicative of a time at which the femtocells are to commence transmitting beacons according to the beacon transmission pattern.

17. The apparatus of claim 15, wherein the beacon transmission time reference comprises a control channel offset.

18. The apparatus of claim 15, wherein the set of femtocells are assigned a common system identifier or a common network identifier.

19. The apparatus of claim 15, wherein the messages instruct the femtocells to transmit beacon signals in synchronization on a plurality of frequencies.

20. An apparatus for communication, comprising:
 a processing system configured to determine that an access terminal has communicated with a first femtocell of a set of femtocells of a multi-femtocell deployment; and
 a network entity or femtocell configured to send at least one message to the set of femtocells as a result of the determination, wherein the at least one message instructs the the set of femtocells to transmit beacon signals according to the specified beacon transmission pattern and beacon time period;
 and wherein the beacon time periods are synchronized in time across the set of femtocells.

21. The method of claim 20, wherein the set of femtocells comprises femtocells having potential coverage of the access terminal.

22. A computer-program product, comprising:
 a non-transitory computer-readable medium comprising code for causing a computer to:
 specify a beacon transmission pattern for a set of femtocells, a beacon time period for the set of femtocells, and a beacon transmission time reference for the set of femtocells;
 send messages to the set of femtocells from a network entity or femtocell, wherein the messages instruct the set of femtocells to transmit beacon signals according to the specified beacon transmission pattern and beacon transmission time reference;
 and wherein the beacon time periods are synchronized in time across the set of femtocells.

23. The computer-program product of claim 22, wherein the beacon transmission time reference is indicative of a time at which the femtocells are to commence transmitting beacons according to the beacon transmission pattern.

24. The computer-program product of claim 22, wherein the beacon transmission time reference comprises a control channel offset.

25. The computer-program product of claim 22, wherein the set of femtocells are assigned a common system identifier or a common network identifier.

26. The computer-program product of claim 22, wherein the messages instruct the femtocells to transmit beacon signals in synchronization on a plurality of frequencies.

27. An apparatus for communication, comprising:
a processing system configured to receive, from a network entity or femtocell, at least one message that specifies a beacon transmission pattern for a set of femtocells, a beacon time period for the set of femtocells, and a beacon transmission time reference for the set of femtocells;
a transmitter configured to transmit beacon signals according to the specified beacon transmission pattern, beacon time period, and beacon transmission time reference;
and wherein the beacon time periods are synchronized in time across the set of femtocells.

28. The apparatus of claim 27, wherein the beacon transmission time reference is indicative of a time at which the femtocells are to commence transmitting beacons according to the beacon transmission pattern.

29. The apparatus of claim 27, wherein the beacon transmission time reference comprises a control channel offset.

30. The apparatus of claim 27, wherein the set of femtocells are assigned a common system identifier or a common network identifier.

31. The apparatus of claim 27, wherein the messages instruct the femtocells to transmit beacon signals in synchronization on a plurality of frequencies.

32. A method of communication, comprising:
receiving at least one message, from a network entity or femtocell, that specifies a beacon transmission pattern for a set of femtocells, a beacon time period for the set of femtocells, and a beacon transmission time reference for the set of femtocells;
transmitting beacon signals according to the specified beacon transmission pattern, beacon time period, and beacon transmission time reference;
and wherein the beacon time periods are synchronized in time across the set of femtocells.

33. The method of claim 32, wherein the beacon transmission time reference is indicative of a time at which the femtocells are to commence transmitting beacons according to the beacon transmission pattern.

34. The method of claim 32, wherein the beacon transmission time reference comprises a control channel offset.

35. The method of claim 32, wherein the set of femtocells are assigned a common system identifier or a common network identifier.

36. The method of claim 32, wherein the messages instruct the femtocells to transmit beacon signals in synchronization on a plurality of frequencies.

37. An apparatus for communication, comprising:
means for receiving at least one message, from a network entity or femtocell, that specifies a beacon transmission pattern for a set of femtocells, a beacon time period for the set of femtocells, and a beacon transmission time reference for the set of femtocells;
means for transmitting beacon signals according to the specified beacon transmission pattern and beacon transmission time reference;
and wherein the beacon time periods are synchronized in time across the set of femtocells.

38. The apparatus of claim 37, wherein the beacon transmission time reference is indicative of a time at which the femtocells are to commence transmitting beacons according to the beacon transmission pattern.

39. The apparatus of claim 37, wherein the beacon transmission time reference comprises a control channel offset.

40. The apparatus of claim 37, wherein the set of femtocells are assigned a common system identifier or a common network identifier.

41. The apparatus of claim 37, wherein the messages instruct the femtocells to transmit beacon signals in synchronization on a plurality of frequencies.

42. A computer-program product, comprising:
a non-transitory computer-readable medium comprising code for causing a computer to:
receive at least one message, from a network entity or femtocell, that specifies a beacon transmission pattern for a set of femtocells, a beacon time period for the set of femtocells, and a beacon transmission time reference for the set of femtocells;
transmit beacon signals according to the specified beacon transmission pattern and beacon transmission time reference;
and wherein the beacon time periods are synchronized in time across the set of femtocells.

43. The computer-program product of claim 42, wherein the beacon transmission time reference is indicative of a time at which the femtocells are to commence transmitting beacons according to the beacon transmission pattern.

44. The computer-program product of claim 42, wherein the beacon transmission time reference comprises a control channel offset.

45. The computer-program product of claim 42, wherein the set of femtocells are assigned a common system identifier or a common network identifier.

46. The computer-program product of claim 42, wherein the messages instruct the femtocells to transmit beacon signals in synchronization on a plurality of frequencies.

47. The apparatus of claim 20, wherein the set of femtocells is based at least in part on the position of an access terminal relative to a position of the set of femtocells of the multi-femtocell deployment.

48. The apparatus of claim 20, wherein:
the access terminal communication with the first femtocell is conducted via a first type of wireless communication technology; and
the beacon signals are associated with a second type of wireless communication technology.

49. The apparatus of claim 20, wherein:
the access terminal communication with the first femtocell comprises a cdma2000 1x registration; and
the beacon signals comprise cdma 1xEV-DO beacon signals.

50. The apparatus of claim 20, wherein the processing system is further configured to:
identify the first femtocell; and
select the set of femtocells based on the identified first femtocell.

51. The apparatus of claim 20, wherein the determination that the access terminal has communicated with the first femtocell comprises:
sending polling messages to the access terminal to track mobility of the access terminal; and
receiving at least one response from the access terminal.

52. A method of communication, comprising:
determining that an access terminal has communicated with a first femtocell of a set of femtocells of a multi-femtocell deployment; and
sending at least one message, from a network entity or femtocell, to the set of femtocells as a result of the determination, wherein the at least one message instructs the set of femtocells to transmit beacon according to the specified beacon transmission pattern and beacon time period;
and wherein the beacon time periods are synchronized in time across the set of femtocells.

53. The method of claim 52, wherein:
the access terminal communication with the first femtocell is conducted via a first type of wireless communication technology; and
the beacon signals are associated with a second type of wireless communication technology.

54. The method of claim 52, wherein:
the access terminal communication with the first femtocell comprises a cdma2000 1x registration; and
the beacon signals comprise cdma 1xEV-DO beacon signals.

55. The method of claim 52, further comprising:
identifying the first femtocell; and
selecting the set of femtocells based on the identified first femtocell.

56. The method of claim 52, wherein the determination that the access terminal has communicated with the first femtocell comprises:
sending polling messages to the access terminal to track mobility of the access terminal; and
receiving at least one response from the access terminal.

57. An apparatus for communication, comprising:
means for determining that an access terminal has communicated with a first femtocell of a set of femtocells of a multi-femtocell deployment; and
means for sending at least one message, from a network entity or femtocell, to the set of femtocells as a result of the determination, wherein the at least one message instructs the set of femtocells to transmit beacon signals according to the specified beacon transmission pattern and beacon time period;
and wherein the beacon time periods are synchronized in time across the set of femtocells.

58. The apparatus of claim 57, wherein:
the access terminal communication with the first femtocell is conducted via a first type of wireless communication technology; and
the beacon signals are associated with a second type of wireless communication technology.

59. The apparatus of claim 57, wherein:
the access terminal communication with the first femtocell comprises a cdma2000 1x registration; and
the beacon signals comprise cdma 1xEV-DO beacon signals.

60. The apparatus of claim 57, further comprising:
means for identifying the first femtocell; and
means for selecting the set of femtocells based on the identified first femtocell.

61. The apparatus of claim 57, wherein the determination that the access terminal has communicated with the first femtocell comprises:
sending polling messages to the access terminal to track mobility of the access terminal; and
receiving at least one response from the access terminal.

62. A computer-program product, comprising:
a non-transitory computer-readable medium comprising code for causing a computer to:
determine that an access terminal has communicated with a first femtocell of a set of femtocells of a multi-femtocell deployment; and
send at least one message, from a network entity or femtocell, to the set of femtocells as a result of the determination, wherein the at least one message instructs the set of femtocells to transmit beacon signals according to the specified beacon transmission pattern and beacon time period;
and wherein the beacon time periods are synchronized in time across the set of femtocells.

63. The computer-program product of claim 62, wherein:
the access terminal communication with the first femtocell is conducted via a first type of wireless communication technology; and
the beacon signals are associated with a second type of wireless communication technology.

64. The computer-program product of claim 62, wherein:
the access terminal communication with the first femtocell comprises a cdma2000 1x registration; and
the beacon signals comprise cdma 1xEV-DO beacon signals.

65. The computer-program product of claim 62, wherein the computer-readable medium further comprises code for causing the computer to:
identify the first femtocell; and
select the set of femtocells based on the identified first femtocell.

66. The computer-program product of claim 62, wherein the determination that the access terminal has communicated with the first femtocell comprises:
sending polling messages to the access terminal to track mobility of the access terminal; and
receiving at least one response from the access terminal.

* * * * *